United States Patent [19]
Meltzer

[11] Patent Number: 5,265,959
[45] Date of Patent: Nov. 30, 1993

[54] TEMPERATURE SENSING APPARATUS

[76] Inventor: Jeffrey N. Meltzer, 3026 Margo La., Northbrook, Ill. 60062

[21] Appl. No.: 962,978

[22] Filed: Oct. 16, 1992

[51] Int. Cl.$^5$ ............... G01K 1/14; G01K 13/02
[52] U.S. Cl. .................... 374/147; 374/162; 137/551
[58] Field of Search ........... 374/141, 147, 159, 161, 374/162; 137/551, 801; 116/216

[56] References Cited

U.S. PATENT DOCUMENTS

| | | | |
|---|---|---|---|
| 1,692,012 | 11/1928 | Wells | 374/162 |
| 2,579,150 | 12/1951 | Leopold et al. | 73/343 |
| 2,626,524 | 1/1953 | Harman | 73/343 |
| 3,441,513 | 4/1969 | Woodmansee | 252/408 |
| 3,585,381 | 6/1971 | Hodson et al. | |
| 3,951,133 | 4/1976 | Reese | 374/162 |
| 3,952,594 | 4/1976 | McMahan | 374/147 |
| 3,957,202 | 5/1987 | Hornsby, Jr. | 239/33 |
| 4,188,437 | 2/1980 | Rohowetz | 428/199 |
| 4,575,262 | 3/1986 | Andersen | 137/551 |
| 4,642,250 | 2/1976 | Spector | 428/1 |
| 4,725,462 | 2/1988 | Kimura | 428/29 |
| 4,773,767 | 9/1988 | Coll | 374/147 |
| 4,919,983 | 4/1990 | Fremin | 428/35.7 |
| 4,971,068 | 11/1990 | Sahi | 374/147 |

FOREIGN PATENT DOCUMENTS

| | | | |
|---|---|---|---|
| 3126931 | 2/1983 | Fed. Rep. of Germany | 374/147 |
| 58-26236 | 2/1983 | Japan | 374/162 |
| 2165646 | 4/1986 | United Kingdom | 374/162 |

Primary Examiner—William A. Cuchlinski, Jr.
Assistant Examiner—G. Bradley Bennett
Attorney, Agent, or Firm—Dick and Harris

[57] ABSTRACT

A temperature sensing apparatus for use in association with faucets, which dispense liquid mediums, such as water. A thermal transfer element, which may comprise a band-like member, includes an inner surface, an exterior surface and a base color visually observable on at least a portion of the exterior surface. Base color changing material is integrally distributed within the thermal transfer element, and, serves to change at least a portion of the base color to one or more alternative colors. Each alternative color is visually observable upon transfer of a predetermined degree of heat generated from the liquid medium to and through the thermal transfer element. Sensitivity enhancement members, which are integrally formed in the thermal transfer element, facilitate the transfer of the degree of heat so generated from the liquid medium, and, in turn, expedite the changing of the base color of the thermal transfer element to the one or more alternative colors.

16 Claims, 1 Drawing Sheet

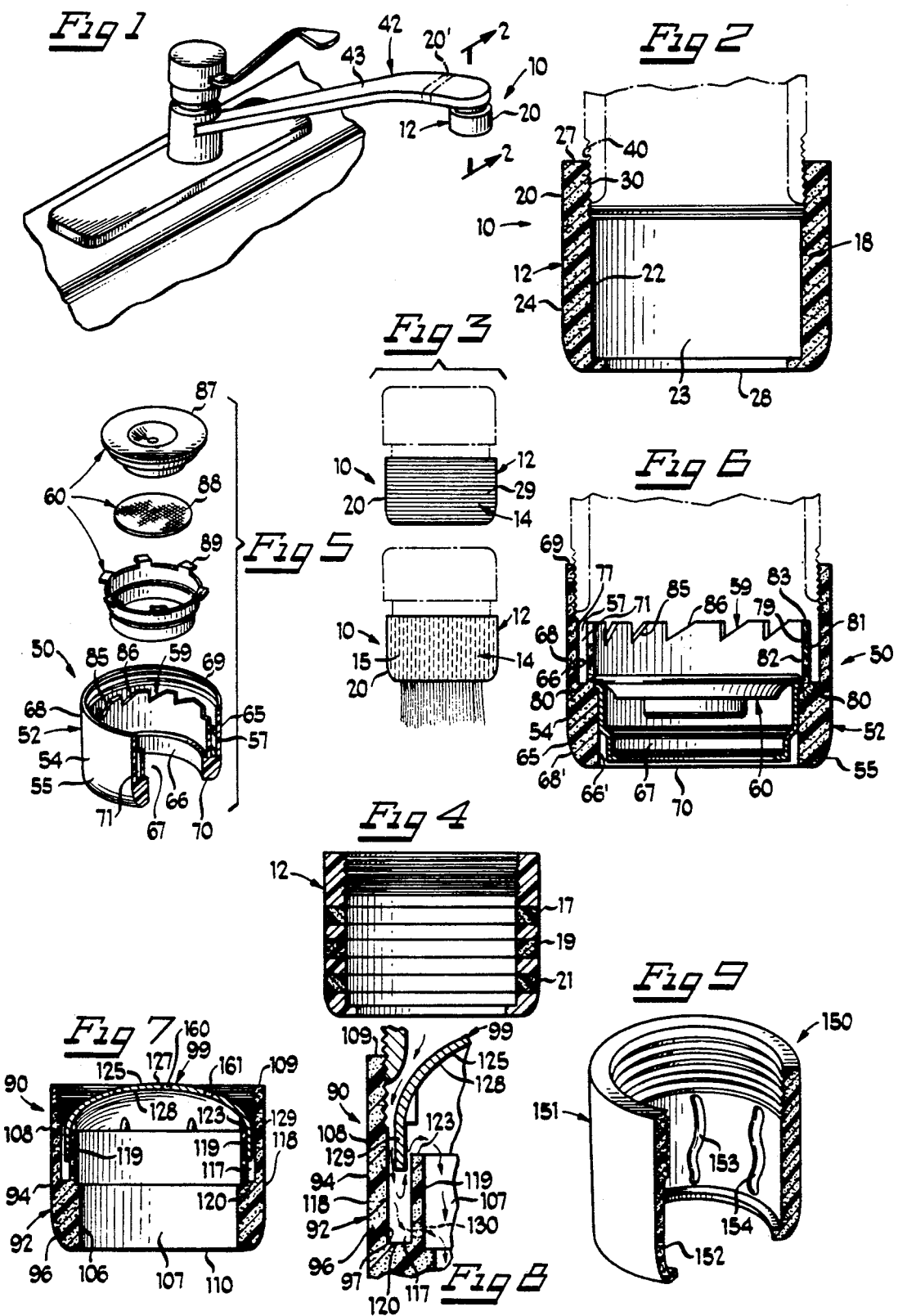

TEMPERATURE SENSING APPARATUS

BACKGROUND OF THE INVENTION

The present invention relates in general to liquid temperature sensing devices, and in particular, to a visually interpretable temperature sensing apparatus for use in association with faucets, which dispense varying temperature liquid mediums, such as water.

Traditionally, testing of the temperature of water, or other liquid, as it is being dispensed from a faucet, has been accomplished by physically touching the liquid as it is being dispensed, and/or through the use of conventional thermometer or thermo-couple devices. Indeed, such thermometer devices have been manually held within the flowing liquid, or, alternatively, they have been attached to a portion of the faucet and/or faucet head where a temperature probe has been positioned in-line with the flow of the liquid. Examples of such prior art thermometers can be found in Leopold, U.S. Pat. No. 2,579,150 and Harman, U.S. Pat No. 2,626,524.

Although such thermometers have proven to provide accurate indications of the temperature of the flowing liquid, they have required more than a "quick glance" to determine whether the liquid flowing from the faucet is at an acceptable temperature. Inasmuch as such thermometers are typically of the "dial type," which include a temperature dial, a dial face, a clear protective cover over the dial face, and a plurality of relatively small sized numbered indicia on the dial face representative of either the Fahrenheit or Centigrade scale, a user of such thermometers must be positioned directly in front of the dial face to obtain an accurate "reading" of the temperature. Furthermore, as is quite common in bathroom environments, steam or heavy condensation in the air often develops when running the faucet for a shower or bath. Accordingly, just as such steam commonly "fogs" up mirrors and other "clear" materials, the protective cover over the dial face of such thermometers also "fog" up—thereby making visibility of the temperature dial, and, in turn, the numbered indicia on the dial face, quite difficult.

Accordingly, few, if any of the prior art temperature indicators for use with faucets facilitate a "quick" visual glance of the faucet head for determining "safe" and "unsafe" temperature ranges of the liquid to preclude scalding, merely by observing the color of the temperature indicator—without having to read numbered indicia on a dial scale and without having to "wipe away" condensation built up on the temperature indicator prior to determining what the temperature is. Furthermore, although some of such prior art has combined, or customized, a thermometer with a faucet head, few if any of such prior art devices have utilized a temperature sensing apparatus which easily attaches to a conventional faucet, wherein the means to indicate the temperature is controlled merely by chromatic color changing material integrally distributed within the material which forms the body of the temperature sensing apparatus.

Additionally, while prior art such as Fremin, U.S. Pat. No. 4,919,983, does disclose the use of chromatic material integrally distributed within a thermoplastic container, and wherein the thermoplastic changes color at predetermined temperature ranges to alert a user as to whether the liquid in the container is at a "safe" or "unsafe" to the touch temperature, such prior art does not contemplate the sensing of the temperature of continuously flowing liquid, nor does it contemplate use in association with a faucet. Furthermore, Fremin, '983, does not appear to provide any means for facilitating the transfer of the heat generated from the liquid to and through the thermoplastic material for expediting the changing of the base color of the thermoplastic to an alternative color.

It is thus an object of the present invention to provide a temperature sensing apparatus which can be attached to a conventional faucet for use in association with a continuously flowing liquid being dispensed from the faucet.

It is also an object of the present invention to provide a temperature sensing apparatus which changes colors depending upon the degree of heat generated from the liquid medium, wherein each particular, visually observable color is representative of a predetermined temperature range of the liquid medium.

It is still further an object of the present invention to provide a temperature sensing apparatus which quickly and easily alerts a user as to whether the flowing liquid is at a "safe" or "unsafe" to-the-touch temperature, merely by glancing at the color of the apparatus.

It is also an object of the present invention to provide a temperature sensing apparatus which includes sensitivity enhancement means which facilitate the transfer of heat generated from the liquid medium to a thermal transfer means so as to expedite the changing of the base color to an alternative color which is representative of a predetermined temperature range of the liquid as it is being dispensed from the faucet.

These and other objects of the present invention will become apparent in light of the present specification, claims and drawings.

SUMMARY OF THE INVENTION

The present invention comprises a temperature sensing apparatus for use in association with faucets, which dispense continuously flowing liquid mediums, such as water. The apparatus includes thermal transfer means operably attached to at least a portion of the faucet for conducting the degree of heat generated from the liquid medium as it passes through either the faucet or the thermal transfer means. The thermal transfer means has an inner surface and an exterior surface, wherein the exterior surface has a base color. The base color is visually observable by a user of the faucet when the thermal transfer means is operably attached to the faucet.

The thermal transfer means also includes means for indicating temperature changes of the liquid medium as it passes through the faucet or the thermal transfer means. The temperature indicating means is integrally distributed within the thermal transfer means and includes means for visually changing at least a portion of the base color of the exterior surface of the thermal transfer means to one or more alternative colors. Such changing in colors occurs upon transfer of the heat generated from the liquid medium through the faucet and/or the thermal transfer means. Furthermore, each of the one or more alternative colors is representative of a predetermined temperature range which is imparted from the liquid medium as it passes adjacent the faucet or the thermal transfer means, to, in turn, impart a visual, colored indication of the temperature of the liquid medium to a user of the faucet, by sight.

In one preferred embodiment of the invention the thermal transfer means comprises a band-like member operably attached to the outer surface of the faucet, in which the liquid medium is isolated from the band-like member as it passes through the faucet. In this embodiment, the inner surface of the thermal transfer means is substantially juxtaposed to the outer surface of the faucet. In another preferred embodiment, the band-like member is operably attached to the faucet so that the liquid medium passing through the faucet will come into direct contact with at least the inner surface of the thermal transfer means. It is contemplated that the band-like member be constructed from material selected from the group of plastics consisting of polyethelene, polypropylene, polystyrene, polyvinyl chloride and polyurethene. However, other types of plastics, non-plastic, as well as liquid pervious materials are also contemplated for use.

In another preferred embodiment of the invention, the temperature sensing apparatus includes sensitivity enhancement means which are integrally formed in the thermal transfer means for facilitating the transfer of the degree of heat generated from the liquid medium between the inner surface of the heat transfer means and the exterior surface of the heat transfer means. The sensitivity enhancement means increases sensitivity of the temperature indicating means, to, in turn, expedite the changing of at least a portion of the base color of the exterior surface of the thermal transfer means to at least one of the one or more alternative colors as the liquid medium comes into direct contact with the thermal transfer means.

The sensitivity enhancement means may comprise alternatively thick and thin transverse cross-sectional dimensions which are operably positioned between the inner and exterior surfaces of the thermal transfer means. The relatively thin transverse cross-sectional dimensions in the thermal transfer means facilitate the expedited changing of at least a portion of the base color of the exterior surface of the thermal transfer means as a result of the degree of heat generated from the liquid medium coming into contact with the thermal transfer means.

In one embodiment of the preferred invention, the relatively thin transverse cross-sectional dimensions of the thermal transfer means comprise one or more veins operably formed in at least a portion of the inner surface of the thermal transfer means.

In another preferred embodiment of the invention, the thermal transfer means includes a top end operably attached to the faucet, a bottom end and an interior channel defined by the inner surface wherein the liquid medium passes through at least a portion of the interior channel and then out through the bottom end so as to make direct contact with the inner surface of the thermal transfer means. In this embodiment, the sensitivity enhancement means comprises a journaled region positioned between the inner and exterior surfaces of the thermal transfer means so as to form a first exterior member and a second interior member in the thermal transfer means. Accordingly, the journaled region is operably positioned between the first exterior and second interior members. The journaled region operably accepts direct contact of at least a portion of the liquid medium passing through the faucet so as to facilitate relatively expedited changing of at least a portion of the base color of the exterior surface of the thermal transfer means (as a function of the degree of heat generated from the liquid medium), to at least one of the one or more alternative colors.

In another preferred embodiment of the invention, the temperature sensing apparatus includes liquid diverting means for operably diverting at least a portion of the liquid medium from the faucet toward and into the journaled region. The liquid diverting means are operably positioned adjacent the journaled region within the interior channel of the thermal transfer means.

In one such embodiment, the liquid diverting means may comprise one or more diverting notches operably formed in the second interior member adjacent the journaled region of the thermal transfer means. In another embodiment, the liquid diverting means comprises a shield member operably positioned adjacent the top peripheral edge of the second interior member of the journaled region for directing the portion of liquid medium into the journaled region. The shield member has an upper surface and a lower surface wherein the upper surface is operably exposed to the liquid medium as it is being directed through the faucet, and the lower surface is operably positioned adjacent the top peripheral edge of the second interior member adjacent the journaled region.

In another preferred embodiment, the second interior member adjacent the journaled region includes one or more apertures for releasing the portion of liquid medium from the journaled region. In addition, an aerator assembly may be operably positioned within the thermal transfer means.

In the preferred embodiment of the invention, the temperature indicating means comprises a chromatic material. This chromatic material may be selected from the group consisting of chromic PP concentrate, chromic PE concentrate, chromic PS concentrate, chromic AS concentrate and chromic EVA concentrate. In addition, any other type of conventional chromatic material which can be integrally distributed within the thermal transfer means, is also contemplated for use.

BRIEF DESCRIPTION OF THE DRAWINGS

FIG. 1 of the drawings is a perspective view of the temperature sensing apparatus in its intended environment, showing, in particular, the operable, alternative positioning of the bandlike thermal transfer means operably attached to a faucet;

FIG. 2 of the drawings is a cross-sectional elevated view of the temperature sensing apparatus, taken generally along lines 2—2 of FIG. 1, and looking in the direction of the arrows, showing in particular, threaded attachment of the thermal transfer means to a conventional faucet, as well as the integrally distributed means for visually changing the base color of the thermal transfer means to one or more alternative colors;

FIG. 3 of the drawings is a front elevated view of the thermal transfer means prior to, and then after, transfer of a predetermined degree of heat from the liquid medium flowing from the faucet, wherein the blue base color of the thermal transfer means may represent a predetermined "safe" temperature range, and the altered bright violet color may represent an "unsafe" temperature of the liquid medium;

FIG. 4 of the drawings is an elevated cross-sectional view of another embodiment of temperature sensing apparatus showing, in particular, three bands of the color changing means wherein each band correlates to a predetermined temperature range;

FIG. 5 of the drawings is an exploded perspective view of another embodiment of temperature sensing apparatus, showing, in particular, a journaled region, liquid medium diverting notches formed in the second interior member adjacent a journaled region, as well as an aerator assembly;

FIG. 6 of the drawings is an enlarged elevated cross-sectional view of the temperature sensing apparatus of FIG. 5, shown operably attached to the end of a faucet, showing, in particular, the positioning of the journaled region between the first exterior and second interior members of the thermal transfer means, the liquid medium diverting notches, and the operable positioning of the aerator assembly within the interior channel of the thermal transfer means;

FIG. 7 of the drawings is an elevated front cross-sectional view of another embodiment of temperature sensing apparatus showing, in particular, the thermal transfer means having a journaled region, as well as a liquid medium diverting shield member operably seated upon the top peripheral edge of the second member adjacent the journaled region, prior to liquid medium being dispensed from a faucet;

FIG. 8 of the drawings is an enlarged cross-sectional view of a portion of FIG. 7 showing, in particular, the elevated, floating positioning of the shield member after the liquid medium has been diverted into the journaled region and then forced out of the journaled region into the interior channel of the thermal transfer means as a result of the continuous pressure exerted from the flowing liquid medium; and FIG. 9 of the drawings is a perspective cross-sectional view of the temperature sensing apparatus showing, in particular, vein members which facilitate the transfer of heat generated from the liquid medium from the inner surface of the thermal transfer means to the exterior surface thereof.

DETAILED DESCRIPTION OF THE DRAWINGS

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Temperature sensing apparatus 10 is shown in FIGS. 1 through 3 as comprising thermal transfer means 12, temperature indicating means 14 (FIG. 3) and color changing means 18 (FIG. 2). Thermal transfer means 12, which comprises band-like member 20, is shown in FIG. 2 as including inner surface 22, interior channel 23 defined by inner surface 22, exterior surface 24, top end 27 and bottom end 28. Inner surface 22 further includes threaded region 30 adjacent top end 27, for threadable cooperation with threads 40 of faucet 42 (FIG. 1).

Although band-like member 20 is shown as being threaded onto the faucet, other means of attachment to the faucet, as well as attachment to other parts of the faucet, are also contemplated. For example, one contemplated alternative includes band-like member 20' (as shown in dashed lines in FIG. 1) being operably attached to outer surface 43 of faucet 42. When such an alternative is used, the degree of heat generated from the liquid medium passing through the faucet will transfer to band-like member 20' through the heat conducted by the faucet itself.

Temperature indicating means 14 includes base color 29 (FIG. 3) and one or more alternative colors, such as alternative colors 15 (FIG. 3) and 17, 19 and 21 (FIG. 4). As will be explained in detail, the base color 29, as well as each of the alternative colors, may represent a predetermined temperature range of the degree of heat generated from the liquid medium.

Color changing means 18 (FIG. 2), which is integrally distributed within thermal transfer means 12, visually changes at least a portion of base color 29, which is visually observable to at least a portion of exterior surface 24, to one or more alternative colors, such as alternative colors 15 (FIG. 3) and 17, 19 and 21 (FIG. 4). Indeed, such a visual change of the base color to one or more of the alternative colors occurs upon transfer of a predetermined degree of heat generated from the liquid medium into thermal transfer means 12. For example, while base color 29 may be blue (FIG. 3), it would change to the alternative color 15 of bright violet (FIG. 3) (or bright red) after the liquid medium reaches an excessively hot/high predetermined temperature range. Accordingly, once such a hot temperature range is reached, the changed, alternative, color, could serve as a warning to a user of faucet 42 that contact of the liquid medium with a user's skin could be unsafe. As a result, the user would then know to adjust the temperature of the liquid medium—without having to physically touch the liquid. Once the temperature of the liquid medium drops below the "unsafe" level, the alternative, changed color 15 of thermal transfer means 12 will change back into its base color 29.

As shown in FIG. 4, it is also contemplated that base color 29 of at least a portion of exterior surface 24 be capable of changing to more than one color—wherein each changed, or alternative, color corresponds to a specific temperature range of the liquid medium. Accordingly, if for example, the temperature range of the liquid medium were below 75 degrees Fahrenheit, only base color 29 (as shown in FIG. 3) would be visually observable. However, as the temperature of the liquid medium rises (or lowers) into other predetermined temperature ranges, the specific color band, such as color bands 17, 19 and 21, which correlates to that specific temperature range, will become visually observable so as to provide a visual indication of the temperature of the liquid medium to a user. Such multi-color changing means, as well as a single color changing means, as previously described, may comprise commercially available chromatic materials which can be integrally distributed within thermal transfer means 12. Such chromatic materials are available from Matsui International Company, Inc., of El Segundo, California, and are commercially sold as chromic PP concentrate, chromic PE concentrate, chromic PS concentrate, chromic AS concentrate and chromic EVA concentrate—although any other type of conventional chromatic material and associated concentrates are also contemplated for use.

Temperature sensing apparatus 50 is shown in FIG. 5 and FIG. 6 as including thermal transfer means 52, temperature indicating means 54 which includes base color 55, sensitivity enhancement means 57, liquid medium diverting means 59 and aerator assembly 60. Thermal transfer means 52 comprises a band-like member 65 having an inner surface 66 (FIG. 5), an interior channel 67 defined by inner surface 66, an exterior surface 68, a top end 69 and a bottom end 70. As previously explained with respect to FIGS. 1 through 4, the color changing means may be integrally distributed within the thermal transfer means, wherein such color changing means causes the changing of the base color of at least a portion of the exterior surface of the thermal transfer means to one or more alternative colors—wherein each alternative color may be representative of, or correspond to, a predetermined temperature range of the liquid medium.

Sensitivity enhancement means 57, as shown in FIG. 6, comprises journaled region 71; defined by first member 77, second member 79 and bottom end 80. First member 77 is defined by a portion of inner surface 66 and exterior surface 68 of thermal transfer means 52, while second member 79 includes first surface 81 and second surface 82. First surface 81 is distally spaced and parallel to inner surface 66 of first member 77, while second surface 82 is positioned adjacent interior channel 67.

Second member 79 further includes top peripheral edge 83. Sensitivity enhancement means 57, and in turn, journaled region 71, imparts to thermal transfer means 52 a relatively thin transverse cross-sectional dimension with respect to the dimension between the inner and exterior surfaces 66 and 68, respectively, adjacent the journaled region; and, a relatively thick transverse cross-sectional dimension with respect to the dimension between inner and exterior surfaces 66' and 68' (FIG. 6), respectively, positioned below bottom end 80 of journaled region 71. Accordingly, as some of the liquid medium from the faucet flows into the journaled region, the relatively thin transverse cross-sectional dimension located adjacent thereto will facilitate the transfer of the heat generated from the liquid medium between inner surface 66 and exterior surface 68 of thermal transfer means 52. Accordingly, such a facilitated transfer of heat will expedite the changing of at least a portion of the base color of the exterior surface adjacent the journaled region to one or more alternative colors—each of which may be representative and/or corresponding to a predetermined temperature range of the liquid medium as it enters the journaled region.

Liquid diverting means 59 may comprise a plurality of diverting notches, such as diverting notches 85 and 86. Each of these diverting notches are operably formed adjacent top peripheral edge 83 (FIG. 6) of second member 79 of journaled region 71. Furthermore, the notches are angled so that when the liquid medium coming out of the faucet comes into contact with the top peripheral edge of the journaled region, such angled notches will divert the liquid toward and into the journaled region so as to facilitate a continuous flow of the liquid medium therein. Accordingly, after the liquid medium has been diverted into the journaled region, it will then be forced down (by the pressure of the liquid medium continuously flowing from the faucet) toward bottom end 80 of journaled region 71, and, then, forced back up toward top peripheral edge 83 of second member 79 where it will then be discharged out of thermal transfer means 52 through interior channel 67. Such continuous flow will help ensure that the liquid medium located in the journaled region, at any given time, will impart a temperature substantially equal to that of the temperature of the liquid medium flowing from the faucet. Also shown in FIG. 5 and FIG. 6 is conventional aerator assembly 60 which includes aerator element 87, aerator screen 88 and screen housing 89.

Temperature sensing apparatus 90 is shown in FIG. 7 and FIG. 8 as including thermal transfer means 92, temperature indicating means 94 which includes base color (not shown), color changing means 96, sensitivity enhancement means 97 and liquid medium diverting means 99. Thermal transfer means 92 includes an inner surface 106, an interior channel 107 defined by inner surface 106, an exterior surface 108, a top end 109 and a bottom end 110 (FIG. 7). Sensitivity enhancement means 97 comprises journaled region 117 which is defined by a first member 118, a second member 119 and a bottom end 120. The second member includes top peripheral edge 123.

As previously explained with respect to FIGS. 5 and 6, the liquid medium diverting means serves to divert the liquid medium flowing from the faucet toward and into the journaled region, to, in turn, facilitate enhanced transfer of the heat generated from the liquid medium through the thermal transfer means. Accordingly, further explanation with respect to FIGS. 7 and 8, will only be made with respect to operation of liquid medium diverting means 99.

Liquid medium diverting means 99 comprises a shield member 125 having an upper surface 127 (FIG. 7), a lower surface 128 and an outer periphery 129. As shown in FIG. 7, lower surface 128 of shield member 125 seats upon top peripheral edge 123 of second member 119 of journaled region 117 prior to exposure of the shield member, and, in turn, the journaled region, to the liquid medium. When in such a seated position, outer periphery 129 of the shield member will be operably positioned within a portion of journaled region 117. Also shown in FIG. 7 are holes, such as holes 160 and 161. These holes enable that portion of the liquid medium not directed into the journaled region (as will be explained) to pass through the shield member.

Shield member 125 is shown in FIG. 8 during exposure of the shield member to a continuous flow of the liquid medium (as represented by the arrows) from a faucet. As the liquid medium is flowing, it is forced (in the direction of the arrows) into contact with upper surface 127 (FIG. 7). Inasmuch as liquid generally follows the path of least resistance, it is easily diverted into journaled region 117. As the continuous flow of the liquid medium continues, the pressure exerted therefrom will force the liquid medium (within the journaled region) back up toward the top peripheral edge of the journaled region, and, in turn, toward and into contact with lower surface 128 of shield member 125. As the liquid medium is forced upward, it "unseats" the shield member from its seated position so as to allow the liquid to discharge from the journaled region and, in turn, out of thermal transfer means 92 through interior channel 107. After the faucet has been turned off, and, accordingly, the flow of liquid has ceased, the shield member will operably return to its seated orientation. Although a "floating" shield member 125 has been shown, non-floating, attached, shield members, are also contemplated for diverting the liquid medium into, and then out of, the journaled region. Also shown in FIG. 8 is aperture 130, shown in dashed lines, which is alternatively contemplated for the release of the liquid medium from the journaled region. Such an aperture, or plurality of apertures, can be used with or without any of the previously described liquid medium diverting means.

Temperature sensing apparatus 150 is shown in FIG. 9 as including thermal transfer means 151 and a plurality of vein members 152, 153 and 154. These vein members result in thermal transfer means 151 having a relatively thin transverse cross-sectional dimension, in the veined regions, and a relatively thick transverse cross-sectional dimension in the non-veined regions. Accordingly, such veins serve to facilitate the transfer of the degree of heat from the liquid medium through the thermal transfer means, to, in turn, expedite the changing of at least a portion of the base color of the thermal transfer means to one or more alternative, temperature dependent colors on the exterior surface.

The foregoing description and drawings merely explain and illustrate the invention and the invention is not limited thereto except insofar as the appended claims are so limited as those skilled in the art who have the disclosure before them will be able to make modifications and variations therein without departing from the scope of the invention.

What is claimed is:

1. A temperature sensing apparatus for use in association with faucets, which dispense continuously flowing liquid mediums, such as water, said temperature sensing apparatus comprising:

thermal transfer means operably attached to at least a portion of the faucet for conducting the degree of heat generated from the liquid medium as it passes through at least one of said faucet and thermal transfer means;

said thermal transfer means having an inner surface and an exterior surface, wherein said exterior surface has a base color and wherein said base color is visually observable by a user of the faucet when said thermal transfer means is operably attached to the faucet;

said thermal transfer means including means for indicating temperature changes of the liquid medium as it passes through said at least one of said faucet and thermal transfer means, said temperature indicating means being integrally distributed within said thermal transfer means, said temperature indicating means further including means for visually changing at least a portion of said base color of said exterior surface of said thermal transfer means to one or more alternative colors upon transfer of the heat generated from the liquid medium through said at least one of said faucet and thermal transfer means, to, in turn, activate said base color changing means, each of said one or more alternative colors being representative of a predetermined temperature range imparted from the liquid medium as it passes adjacent said one or more of said faucet and thermal transfer means to, in turn, impart a visual, colored indication of the temperature of the liquid medium to a user of the faucet, by sight.

2. The invention according to claim 1 in which said faucet has an outer surface:

said thermal transfer means comprises a band-like member operably attached to said outer surface to, in turn, isolate said liquid medium from said band-like member as it passes through the faucet, said inner surface of said thermal transfer means being substantially juxtaposed to an outer surface of said faucet.

3. The invention according to claim 1 in which said thermal transfer means comprises a band-like member operably attached to said faucet, said liquid medium passing through said faucet coming into direct contact with at least a portion of the inner surface of said thermal transfer means.

4. The temperature sensing apparatus according to claim 3 in which the invention further includes sensitivity enhancement means integrally formed in said thermal transfer means for facilitating the transfer of the degree of heat generated from the liquid medium between said inner surface of said heat transfer means and said exterior surface of said heat transfer means, said sensitivity enhancement means increasing sensitivity of said temperature indicating means to, in turn, expedite the changing of said at least a portion of said base color of said exterior surface of said thermal transfer means to at least one of said one or more alternative colors as the liquid medium comes into direct contact with said thermal transfer means.

5. The invention according to claim 4 in which said sensitivity enhancement means in said thermal transfer means comprises alternatively thick and thin transverse cross-sectional dimensions operably positioned between said inner and exterior surfaces;

said relatively thin transverse cross-sectional dimensions in said thermal transfer means facilitating the expedited changing of at least a portion of said base color of said exterior surface of said thermal transfer means as a result of the degree of heat generated from the liquid medium coming into contact with said thermal transfer means.

6. The invention according to claim 5 in which said relatively thin transverse cross-sectional dimensions of said thermal transfer means comprise one or more veins operably formed in at least a portion of said inner surface of said thermal transfer means.

7. The invention according to claim 4 in which said thermal transfer means further includes a top end operably attached to said faucet, a bottom end and an interior channel defined by said inner surface wherein the liquid medium passes through at least a portion of said interior channel and past and through said bottom end so as to make direct contact with the inner surface of said thermal transfer means.

8. The invention according to claim 7 in which said sensitivity enhancement means comprises a journaled region positioned between said inner and exterior surfaces of said thermal transfer mean so as to form a first exterior member and a second interior member in said thermal transfer means, said journaled region being operably positioned between said first exterior and second interior members.

said journaled region operably accepting at least a portion of the liquid medium passing through the faucet to, in turn, enable said operable direct contact of said passing liquid medium with at least a portion of said thermal transfer means proximate to said first exterior member so as to facilitate relatively expedited changing of at least a portion of said base color of said exterior surface of said thermal transfer means, as a function of the degree of heat generated from the liquid medium, to at least one of the one or more alternative colors.

9. The invention according to claim 8 in which said temperature sensing apparatus further includes liquid diverting means for operably diverting said at least portion of liquid medium from said faucet toward and into said journaled region, said liquid diverting means being operably positioned adjacent said journaled region within said interior channel of said thermal transfer means.

10. The invention according to claim 9 in which said liquid diverting means comprises one or more diverting notches operably formed in said second interior member adjacent said journaled region of said thermal transfer means.

11. The invention according to claim 9 in which said second interior member adjacent said journaled region has a top peripheral edge substantially adjacent said top end of said thermal transfer means:

said liquid diverting means comprising a shield member operably positioned adjacent said top peripheral edge of said journaled region for directing said portion of liquid medium into said journaled region;

said shield member having an upper surface, a lower surface wherein said upper surface is operably exposed to the liquid medium as it is being directed through the faucet, said lower surface being operably positioned adjacent said top peripheral edge of said second interior member adjacent said journaled region.

12. The invention according to claim 11 wherein said second interior member adjacent said journaled region further includes one or more apertures for releasing said portion of liquid medium from said journaled region.

13. The temperature sensing apparatus according to claim 3 in which the invention further includes an aerator element operably positioned within said thermal transfer means.

14. The invention according to claim 1 in which said temperature indicating means comprises a chromatic material.

15. The invention according to claim 14 in which said chromatic material is selected from the group consisting of chromic PP concentrate, chromic PE concentrate, chromic PS concentrate, chromic AS concentrate and chromic EVA concentrate.

16. The invention according to claim 1 in which said thermal transfer means is constructed from material selected from the group of plastics consisting of polyethylene, polypropylene, polystyrene, polyvinyl chloride and polyurethane.

* * * * *